United States Patent [19]
Marriott

[11] Patent Number: 6,092,670
[45] Date of Patent: Jul. 25, 2000

[54] STEAM PAN MANIPULATION DEVICE

[76] Inventor: Victor J. Marriott, 900 W. Main St., Norman, Okla. 73069

[21] Appl. No.: 09/424,172
[22] PCT Filed: May 22, 1998
[86] PCT No.: PCT/US98/10382
    § 371 Date: Nov. 19, 1999
    § 102(e) Date: Nov. 19, 1999
[87] PCT Pub. No.: WO98/52669
    PCT Pub. Date: Nov. 26, 1998

Related U.S. Application Data
[60] Provisional application No. 60/047,401, May 22, 1997.

[51] Int. Cl.[7] ................................................. B01D 35/28
[52] U.S. Cl. .................. 210/469; 210/470; 210/475; 99/413
[58] Field of Search ..................... 210/465, 469, 210/475, 470; D7/667, 692; 99/413; 22/189.07

[56] References Cited

U.S. PATENT DOCUMENTS

| | | |
|---|---|---|
| D. 179,912 | 3/1957 | Marshall . |
| 434,452 | 8/1890 | Matthews . |
| 857,329 | 6/1907 | Carey . |
| 1,053,780 | 2/1913 | Brooks . |
| 1,183,468 | 5/1916 | Knight . |
| 1,214,800 | 2/1917 | Link . |
| 1,325,613 | 12/1919 | Beebe . |
| 2,133,724 | 10/1938 | Smulski . |
| 2,284,342 | 5/1942 | Quinby . |
| 2,400,642 | 5/1946 | Hassel . |
| 2,507,159 | 5/1950 | Holmgren et al. . |
| 2,520,382 | 8/1950 | Conrad et al. . |
| 2,541,094 | 2/1951 | Pesenti . |
| 3,240,348 | 3/1966 | Serio . |
| 4,220,534 | 9/1980 | Perry . |

FOREIGN PATENT DOCUMENTS

| | | |
|---|---|---|
| 543261 | 2/1957 | Italy . |
| 147159 | 10/1954 | Sweden . |

Primary Examiner—W. L. Walker
Assistant Examiner—Terry K. Cecil
Attorney, Agent, or Firm—James F. Harvey, III

[57] ABSTRACT

A steam pan manipulation device (16) is provided for handling stainless steel pans (10), commonly known as steam pans or hotel pans, of varying sizes as found in commercial restaurant, catering, and hotel applications for use in steam tables. Use of the device (16) permits the worker to safely carry a tray full of liquid without sloshing, since the center of gravity of the liquid is lower than the point of carrying. Furthermore, the steam pan manipulation device (16) features apertures of an appropriate size, so that the device may be also used as a strainer for separating liquid from the content of the tray while retaining solid content in the tray.

9 Claims, 2 Drawing Sheets

2

STEAM PAN MANIPULATION DEVICE

CROSS-REFERENCES TO RELATED APPLICATIONS

This application relies for priority on copending provisional patent application U. S. patent application, Ser. No. 60/047,401, filed on May 22, 1997. This application is incorporated herein by this reference.

STATEMENT AS TO RIGHTS TO INVENTIONS MADE UNDER FEDERALLY SPONSORED RESEARCH AND DEVELOPMENT

This invention was made in the absence of any federally sponsored research and development contract.

BACKGROUND

A. Field of the Invention

This invention relates generally to commercial kitchen utensils. More particularly, the present invention provides a device which is detachably attached to a steam table pan, for removing a pan from its receptacle on a steam table, carrying the pan and its contents to different locations without sloshing the contents onto the carrying individual, and manipulating pan to tilt the pan to strain liquids from the pans by a single individual while retaining solid material in the pan.

B. Description of the Related Art

This invention is directed to use in the commercial food preparation industry, in which large quantities of food are prepared for large groups of people to be served in an "assembly line" or buffet fashion. Such situations include, but are not limited to, catering services, hotels, schools, conventions, parties, and other large gatherings of similar nature.

Typically, the food served commercially in a serving line or in buffet fashion is contained in rectangular, stainless steel pans, commonly known as steam pans or hotel pans. These pans are of a standard size known to the food industry. A steam table is a device for keeping the contents of the pans warm. It consists of a shallow tank for holding a quantity of hot, steaming water and a surface into which several standard rectangular holes are cut. The holes on the surface of the steam table engage the flanges of the steam pans so that the bottoms of the steam pans are immersed in the bath of hot water to warm the pan and its contents. If the pan is of the same size as the rectangular opening, then steam cannot escape from between the flange of the pan and the surface of the steam table. However, when the pan is lifted out of the rectangular opening, the accumulated steam will escape and possibly scald the unwary food handler.

The openings in the surface of the steam tables are of a standard size, and the steam pans are thus constructed of standard, modular sizes to fit these openings. The largest size fits exactly into the standard opening of the steam table and the remaining sizes consist of half, third, fourth, and sixth sizes which, when several sizes are appropriately configured, will fill the standard opening.

These pans typically contain solid food in a liquid broth which keeps the solid food heated without burning. Several problems arise in the course of manipulating these pans when they are filled almost to the brim with hot food. First, the pans are hot so that a standard pot holder, towel, or other cloth must be used to carry the pan so as to prevent the heat from injuring the carrier. Care must be taken to prevent edge of the towel from contacting the food, thus contaminating it.

Second, when the pans are residing in the steam table, the flanges of the pan are flush with the steam table so that it is difficult to get fingers or other implements under the flange to lift the pan out of the table. Knives, spatulas, and other flat objects are employed by food handlers to pry a heavily laden pan from its steam table opening. If a sharp instrument such as a knife is used, then the handler risks injury if the knife should slip.

Third, the steam which escapes from around the flange when the pan is lifted from the table may be concentrated at the initial spot where a lifting force is applied, so that the person performing the lifting operation must take precautions to prevent scalding of the hands.

Fourth, pans are carried by the flanges and, when manipulated, the pan contents tends to slosh and spill. It is well known in the industry that if the point from which a pan is carried is higher than the rim of the pot or pan, there is less chance for sloshing and for spilling the contents, because both pan and contents move back and forth with roughly the same motion.

Fifth, in order to prevent waste of food, the contents of the pan is typically strained and stored for a later occasion. Excess liquid broth must be drained from the pan, while retaining the solid food for future use, e.g. draining water from peas or broth from meat. If the pan is tipped to pour the liquid out from a corner, the food handler risks losing some of the solid food with the drained liquid. A common strainer or colander could be placed in the sink and the contents of a pan poured through such a strainer, but this commonly used process has two disadvantages. The first is that, when one person is performing the straining operation, the strainer must be placed in a sink and the individual must use both hands to pour the contents of the tray through the strainer. However, back splash from the sink may fall on the food which has been dumped into the strainer, resulting in contaminated food. The second is that two people are required for the draining operation if such back splashing is to be avoided, one to hold the strainer at a height above the sink so as to avoid back splash and the other to hold and pour the pan contents into the strainer.

At present, there is no device in common use which can be used to assist food preparation personnel to manipulate these steam pans in an efficient manner. The prior art is replete with all manner of straining devices, but all are limited to circular pots and not to rectangular pans. Some of these straining devices allow the user to carry the pot and serve as a lid as well, but, again, none are applicable to the shallow, commercial food trays used in steam tables. Finally, none appear to specifically address the unique problem associated with the initial lifting of the container from a hot water bath, namely, that of the individual being accidently scalded by steam upon initially lifting the container from the steam table.

SUMMARY

This invention consists of a device or tool for commercial use which can be used to carry, support, manipulate, drain, and strain steam pans used in commercial food handling applications such as hotels or cafeterias. It may be used for steam pans with English dimensions used in the United States or for steam pans with metric dimensions used in Europe. While numerous embodiments of the invention are possible, the best mode for manufacturing the invention is from a single piece of stainless steel or similar material which resists temperature, corrosion, and food contamination.

It is therefore an object of the present invention to provide a means for gripping the flange of the standard commercial steam pan in a manner which will permit rapid engagement and disengagement of the gripping device.

It is further an object of the present invention to provide a means whereby the contents of a standard commercial steam pan may be drained and strained by a single individual without allowing splash back to contaminate the contents of the pan.

It is further an object of the present invention to provide a means of carrying a loaded pan from a point of suspension above the plane formed by the flange of the pan, so that the pan will move with and in the same direction as its contents and thus prevent the contents from sloshing over the flange.

It is further an object of the present invention to prevent scalding and other accidents from occurring while manipulating filled steam pans by providing lifting means which is above the level of the contents of the pan and inwardly from the flange, so that when the pan is lifted from the surface of a steam table, the hands of the food handler are out of range of the rising steam.

Further objects and advantages of this invention and its various embodiments will become more readily apparent upon reference to the following detailed description of a preferred embodiment, as illustrated in the accompanying drawings.

INDEX

Figure 1:
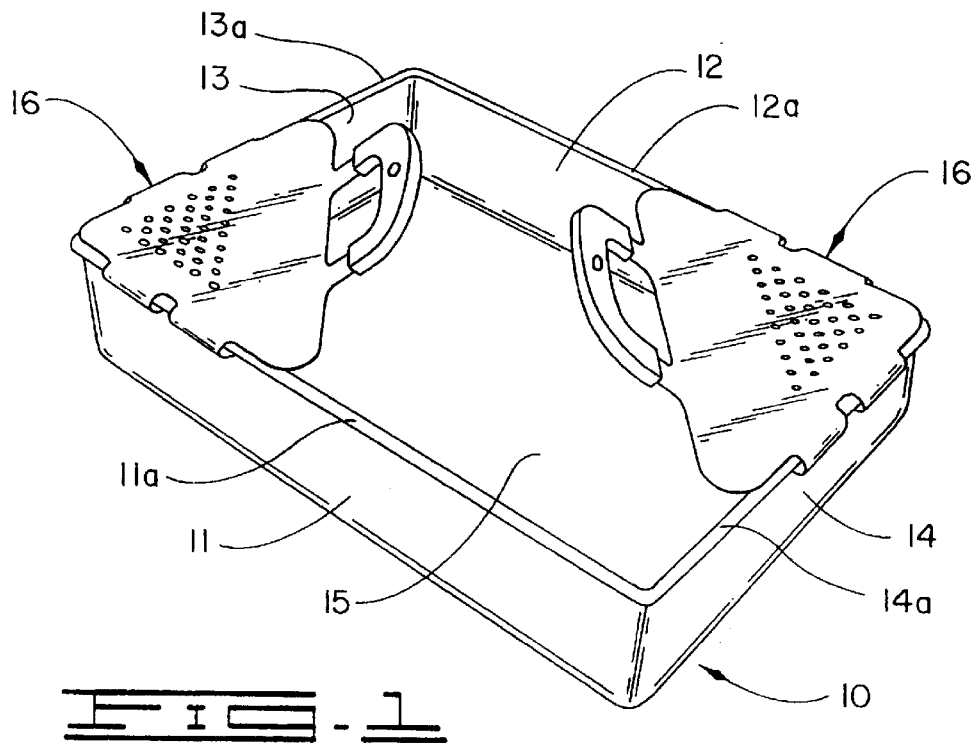
FIG. 1 is a perspective view of two manipulating devices of the invention employed to carry a standard commercial steam pan.

10 Steam pan
11 Side wall of steam pan
11a Flange on side wall of steam pan
12 Side wall of steam pan
12a Flange on side wall of steam pan
13 Side wall of steam pan
13a Flange on side wall of steam pan
14 Side wall of steam pan
14a Flange on side wall of steam pan
15 Bottom of steam pan
16 Manipulation device
17 Body
18 Handle
19 Hand hole
20 Grip
21 Dimple
22 Handle covering
23 Straining hole

DETAILED DESCRIPTION OF THE PREFERRED EMBODIMENTS

Referring now to FIG. 1 of the drawings, a conventional steam pan 10 is rectangular in shape and comprises side walls 11, 12, 13, 14 interconnected by a flat bottom 15. The side walls terminate in outwardly rolled flanges 11a, 12a, 13a, and 14a. The flanges normally support the pan 10 in a cutout on the surface of a steam table (not shown) in a well-known manner.

Figure 2:
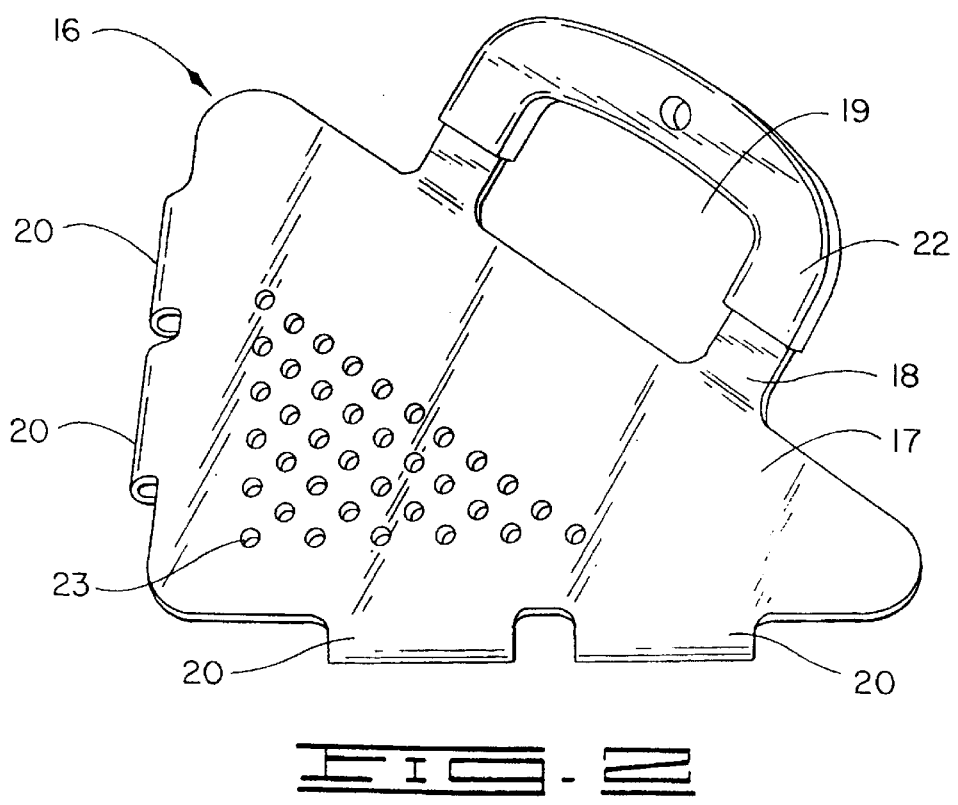
FIG. 2 is a perspective view of one of the devices shown in FIG. 1.

The manipulation device 16, as depicted in FIG. 2, consists of a flat triangular surface, or body 17, having a handle 18 extending upwardly and outwardly from one side and a pair of grips 20 curled under from each of the other two sides of the triangular body 17. The best mode for this configuration is to cut a flat pattern from a flat piece of stainless steel where the pattern contains tabs appending from each of the three triangular sides of the body which can be formed into the grips 20 and the handle 18, and then to form the grips 20 by rolling the grip tabs around a circular cross section.

While the best mode for forming the grip 20 is as described, other modes of forming a grip 20 consist of, and are not limited to, attachment of appropriately shaped pieces of material for form a grip 20 by either welding, gluing, adhesive, braising, screwing, bonding, or bending, or by a combination of these methods.

Figure 3:
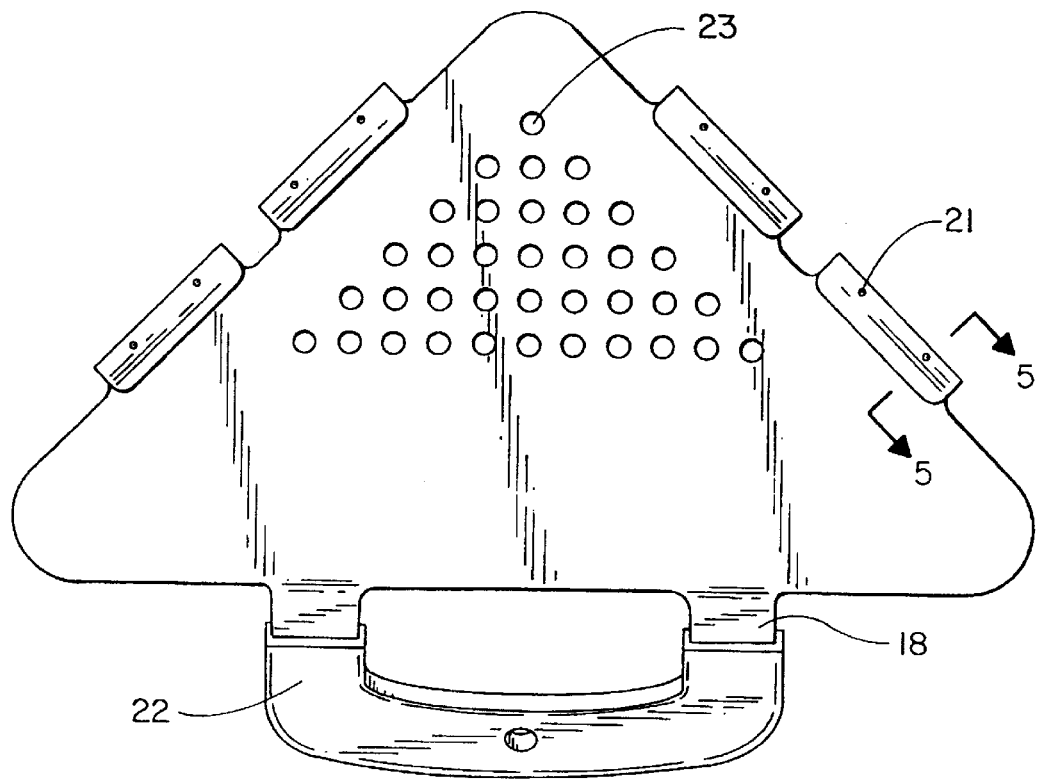
FIG. 3 is a bottom view of the device of FIG. 2.
Figure 4:
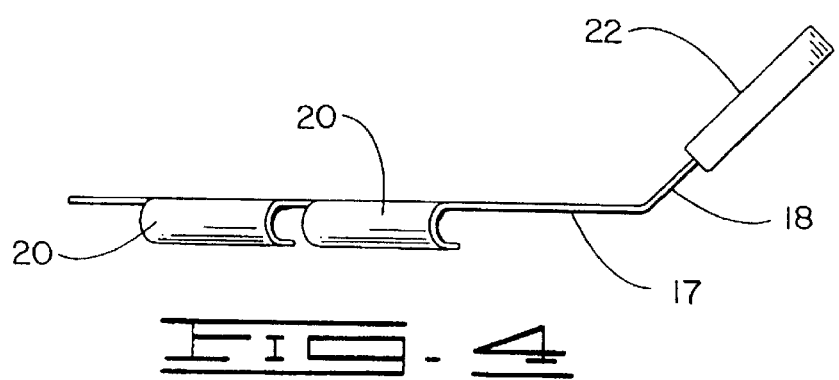
FIG. 4 is a side view of the device of FIG. 2.

Referring to FIG. 3, the handle 18 is formed by bending the handle tab in the opposite direction from which the grips 20 are rolled to an angle of between 0 and 90 degrees; a 45 degree angle is shown in FIG. 2. A piece of metal within the handle tab is removed so as to create a hand hole 19 that is generally the width of four human fingers, and to bend the handle tab and hole in a direction opposite the gripping means, thereby forming a bend with the body 17 whose angle is between 0 and 90 degrees to the surface of the plane of the device. Other modes of forming a handle 18 consist of, and are not limited to, the attachment of a specially shaped piece of material by means such as welding, gluing, braising, screwing, bonding, or mechanical attachment by friction.

The two sides of the body 17 to which grips 20 are attached meet at a 90 degree angle to conform to the corner of a rectangular pan. Since each of the four corners of the steam pan can function as a pouring spout, the triangular body 17 will fit into an arbitrary corner of a steam pan such that the 90 degree angle corner of the body 17 is at the corner of the pan, the handle 18 of the triangular body 17 is on the side opposite the 90 degree corner, and the grips 20 are on each of the remaining two sides of the body 17 and holding the body 17 against the flange of the steam pan.

Figure 5:
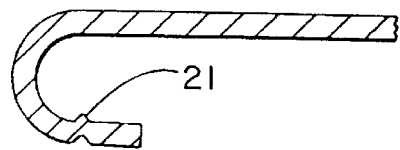
FIG. 5 is an enlarged sectional view taken along line 5—5 of FIG. 3.

Referring now to FIG. 3, each grip 20 on the two sides of the body 17 has a semicircular cross section which will fit around the flange of a standard steam pan. The cross-sectional aspect of the grips 20, as shown in sectional line 5—5 in FIG. 3, is generally that of a semicircle with the diameter of the semicircle generally equal to the width of the flange of the steam pan. The preferred mode for the configuration of the grips 20 is to have at least two grips 20 on each of the two sides of the triangular body 17. Indentations on the interior of the tabs, or dimples 21 as shown in the sectional view in FIG. 5, provide a more secure gripping means for the flange of the pan. These dimples 21 are constructed by impressing a generally circular die into the metal of the grip 20 so that the opposite of the metal is made to protrude beyond the plane of the metal on the opposite side. The impression may also be in the form of a bar, a rectangle, or any geometric shape which would provide the necessary protrusion.

A handle covering 22 may optionally be applied over and enclosing the handle 18 to provide a better gripping surface, to prevent heat conduction to the hand, and to prevent the metal edges of the hole in the handle 18 from injuring the hand. This handle covering 22 may consist of, but not be limited to, the following modes: dipping the handle in a rubberized mixture which adheres to the handle; attaching two pieces of a non-conducting material to either side of the handle means and securing them to the handle means by screws, rivets, or glue; or forming solid handle covering wider than the thickness of the handle means, having a longitudinal slot to receive the handle, and secured to the handle 18 by either friction, screws, rivets, or adhesive. The best mode for the handle covering 22 consists of forming two halves of material to the handle 18 by means of heat, so that no grooves are available to allow food, bacteria, or other contaminants to lodge. The handle covering 22 should be composed of a non-volatile substance which will not affect food or flavor its contents.

A series of straining holes 23 are cut or punched into the body 17 to serve as a straining function. They facilitate the separation of a liquid from more solid material. The preferred embodiment of these straining holes 23 is to have a grid of one or more holes at the nearest point of the 90 degree angle of the body 17. Although they are circular as drawn, the straining holes 23 may also have the form of elongated slots in a direction which is generally perpendicular to the side of triangle upon which the handle means is located. The size of the hole 23 and/or the width of each slot may vary depending upon the size of the solid matter which is to be separated from the liquid contained in a steam pan.

In practice, a pair of manipulation devices 16 as described above are used to carry and manipulate a steam pan, as seen in FIG. 1. The figure depicts two manipulation devices 16 employed at opposing corners of a steam pan of arbitrary size. The handles 18 are interior to the pan and displaced from the flanges 11a, 12a, 13a, and 14a, so that, when the manipulation devices are used to engage the steam pan to remove it from a steam table, escaping steam does not come into close proximity with the hands of the food handler. From the configuration depicted in FIG. 1, the food handler could tip the steam pan in either direction and thus remove liquid from the steam pan while retaining solid contents in the steam pan.

Some pans in commercial use are circular in shape, rather than rectangular; however, the invention may be used in a similar manner with circular pans as it is with rectangular pans. While the present invention is not described in a manner which would be applicable to circular pans of this nature, the leading edge of the manipulation device could be adapted for similar use with circular pans as well as for rectangular pans.

The inventor regards as his invention the use of a steam pan manipulation device which can be engaged with any of the four corners of a steam or hotel pan and which can be easily and positively disengaged.

The inventor further regards as his invention a second embodiment of the use of a universal food preparation device which can be engaged with a circular steam pan and which can be easily and positively disengaged.

The inventor further regards as his invention the use of a gripping means to temporarily attach the invention to a corner of an arbitrarily sized steam pan for the purpose of either supporting the pan while it is tipped to strain liquid from the pan or carrying the pan.

The inventor further regards as his invention the use of a handle 18 for supporting the pan from a point above the plane of the steam pan flange so that the steam pan and its contents will move in the same direction while being carried, thus preventing the contents of the steam pan from spilling during carrying operations which would result in sloshing.

The inventor further regards as his invention the engagement point of the universal commercial strainer as being at a corner of a steam pan rather than at a side.

While the above description contains many specifics, these should not be construed as limitations on the scope of the invention, but rather as examples of one preferred embodiment thereof. Many other variations are possible. For example, a similar device might be fabricated from a five sided piece of metal formed by removing two of the corners of a triangular shaped piece of metal. Another example might be the use of a standard mesh used in a commonly available strainer instead of the use of slots punched or drilled in the face of the triangular piece of metal. Also the main embodiment of the device may be adapted for different sized pans, e.g. circular pans or oval pans. Accordingly, the scope of the invention should be determined not by the embodiments illustrated but by the appended claims and their legal equivalents.

What is claimed is:

1. A steam pan manipulation device for being detachably secured at a corner of a rectangular steam pan and to a flange thereof, whereby the steam pan may be safely removed from the top of a steam table with reduced danger of scalding the person lifting the steam pan when steam is emitted from around the periphery of the steam pan as it is vertically lifted from the steam table and whereby the steam pan may be safely carried with reduced danger of spilling hot liquid on the person carrying the pan through sloshing or inadvertent disengagement of the device from the pan, the device comprising a flat, generally triangular-shaped base having a first side, a second side, and a third side oriented at a ninety degree angle to the second side, generally conforming in shape to a corner of a rectangular steam pan having a flange around its upper perimeter;

a gripping means associated with the second side and the third side of the base, orienting the intersection point of the second side and third side of the base with the corner of the steam pan, detachably attaching the base to the flange of the steam pan, and resisting disengagement of the base from the steam pan when a force directed vertically or inwardly towards the interior of the pan is applied but allowing disengagement of the base from the pan when a force directed outwardly from the interior of the pan is applied in the absence of vertical force, whereby the base is held in close contact with and in the same plane as the flange of the pan; and a handle directed inwardly towards the interior of the steam pan and disposed upwardly away from the plane of the top of the steam pan, whereby the steam pan may be removed from a steam table, supported, and carried from a point of suspension above the steam pan.

2. The steam pan manipulation device described in claim 1, wherein the gripping means is formed by bending a tab integral to the second side of the base and bending a tab integral to the third side of the base, each tab forming a generally circular cross-section, whereby the gripping means fits snugly around the flange of a steam pan.

3. The steam pan manipulation device described in claim 2, wherein each gripping means includes a safety dimple impressed into the interior circumference of each circularly formed tab, whereby each dimple serves to lock the gripping means to said pan in a manner which can be easily disengaged by a positive force directed outwardly from the center of the pan without inadvertent disengagement through accidental forces.

4. The steam pan manipulation device described in claim 1, additionally comprising one or more apertures of arbitrary shape formed in the base, whereby liquid contained in the steam pan to which the device has been affixed may be allowed to escape from the steam pan when the steam pan is tilted in the direction of the apertures, thereby retaining solid matter in the steam pan.

5. A pair of steam pan manipulation devices for detachable attachment to opposing corners of a rectangular steam pan having a flange around the top edge of the steam pan, in order to facilitate manipulation of the steam pan, characterized by each device comprising a flat, generally triangular-shaped base having a first side, a second side, and a third side oriented at a ninety degree angle to the second side, generally conforming in shape to a corner of a rectangular steam pan having a flange around its upper perimeter;

a gripping means associated with the second side and the third side of the base, orienting the intersection point of the second side and third side of the base with the corner of the steam pan, detachably attaching the base to the flange of the steam pan, and resisting disengagement of the base from the steam pan when a force directed vertically or inwardly towards the interior of the pan is applied but allowing disengagement of the base from the pan when a force directed outwardly from the interior of the pan is applied in the absence of vertical force, whereby the base is held in close contact with and in the same plane as the flange of the pan; and a handle directed inwardly towards the interior of the steam pan and disposed upwardly away from the plane of the top of the steam pan, whereby the steam pan may be removed from a steam table, supported, and carried from a point of suspension above the steam pan, whereby each device is attached to opposing corners of the steam pan with the handles extending inwardly of and above the pan to facilitate manipulation of the steam pan.

6. The manipulation devices of claim 5, further characterized by the gripping means each comprising at least one downwardly and inwardly curled lip having an opening sized to embrace the flange of the pan, the lip being curled sufficiently inwardly back towards the steam pan so as to provide lifting support for the steam pan when a vertical force is applied to the handle.

7. The manipulation devices of claim 6, further characterized by each curled lip including a detent dimple extending into the opening to narrow the opening over which the flange of the steam pan must be forced to prevent inadvertent disengagement of a lip from the pan flange, thereby facilitating the manipulation of the pan by the devices.

8. The manipulation devices of claim 5, further characterized by the base comprising a flat material sheet having at least one aperture formed therein to enable the steam pan to be tilted to strain liquid from the steam pan through the at least one aperture.

9. A method of manipulating and maneuvering a rectangular steam pan having a flange around its top opening, comprising the steps of engaging a first steam pan manipulation device at a first corner of the steam pan, said device comprising a flat, generally triangular-shaped base having two edges which conform in shape to the first corner of the steam pan;

a gripping means associated with the conforming edges of the base, each edge having a downwardly and inwardly curved lip for detachable insertion under the flange of the steam pan and resisting disengagement from the steam pan when a force directed vertically or inwardly towards the interior of the pan is applied and holding the base in close contact with and in the same plane as the flange of the pan; and a handle directed inwardly towards the interior of the steam pan and disposed upwardly away from the plane of the top of the steam pan;

engaging a second steam pan manipulation device at a second corner of the steam pan diagonally opposing the first corner, the second device being of substantially the same structure as the first device;

applying inwardly directed force to the handles of the first and second devices, whereby the gripping means of each device securely engages the flange of the steam pan; and applying vertically directed force to the handles of the first and second devices, whereby the steam pan may be lifted and carried from two suspension points above the plane of the top opening of the steam pan and slightly interior to the top opening of the steam pan.

* * * * *